INVENTOR.
GERALD L. RUTKOWSKI
BY
Tweedale & Gerhardt
ATTORNEYS.

United States Patent Office 3,477,314
Patented Nov. 11, 1969

3,477,314
CHANGE SPEED PLANETARY TRANSMISSION
Gerald L. Rutkowski, Westland, Mich., assignor to Massey-Ferguson Inc., Detroit, Mich., a corporation of Maryland
Filed Nov. 28, 1967, Ser. No. 686,154
Int. Cl. F16h 3/62
U.S. Cl. 74—750                                    3 Claims

ABSTRACT OF THE DISCLOSURE

A transmission and more specifically a three-speed planetary gear unit is disclosed which has one control means operable to provide three speed ratios.

---

In heavy vehicles such as tractors, planetary gear units are often combined with a conventional change speed gear to increase the available number of gear ratios. By providing a first alternative clutching means to alternatively connect the power input to different gear elements of the planetary gear and a second alternative clutching means to connect the power output to different gear elements of the planetary gear it is possible to provide three speed ratios with a simple planetary gear set having a sun gear, a ring gear and a planet carrier having pinions in mesh with the sun gear and ring gear.

Up to now the first and second clutching means for such a planetary gear unit have consisted of a dual shifting arrangement. This means that two shifter forks had to be used to establish various ratios in the gear unit. This requires bulky construction and the inconvenience of actuating two separate shifter forks to carry out one clutching operation.

It is therefore an object of this invention to provide a planetary gear unit with one single clutching means so as to make the shifting operation easy and uncomplicated and to save valuable space in the tractor.

A more complete understanding of the features and operation of the invention, together with additional objects thereof, may be gained from a reading of the following description in conjunction with the accompanying drawing, in which.

Figure 1:
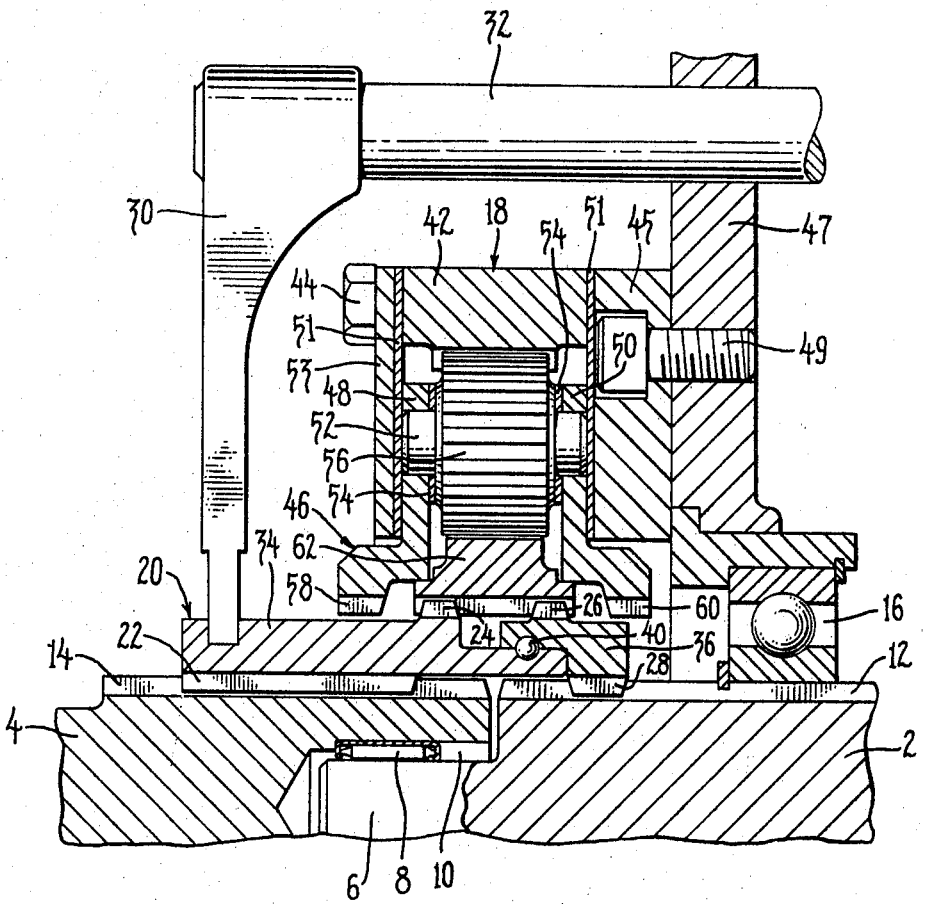
FIG. 1 shows the upper half of a planetary gear unit in partial section in a 1:1 drive transmission.

Referring more particularly to the drawing the input shaft 2 comes from any source of power such as an engine or a conventional change speed gearing and is piloted into a coaxial output shaft 4 by means of a pilot 6. A roller bearing 8 between the pilot 4 and a hollow 10 in the end of output shaft 4 aids in the freely rolling relationship between the two shafts. The shaft 2 has long spline or clutch teeth 12 all around its periphery. Similarly, output shaft 4 carries long spline or clutch teeth 14 around its periphery. A bearing assembly 16 surrounds the shaft 2. A corresponding bearing for shaft 4 is not shown in the drawing.

Adapted to be operatively connected with the shafts 2 and 4 is a simple planetary gear unit 18 of which only the upper half is shown in the drawing. The means which connect the planetary gear 18 with the shafts 2 and 4 is a clutch device in the form of a slidable sleeve 20 having four rings of clutch teeth 22, 24, 26, 28. The rings of teeth 22 and 28 are at the inside periphery and the rings of teeth 24 and 26 at the outside periphery of the clutch 20. The clutch device 20 is slidable under the control of a fork 30 and a slide rod 32.

In order to enable the planetary gear to establish 1:1 drive, overdrive or underdrive between the input and the output shaft, it is necessary that the clutch device consists of two portions 34 and 36 which are interconnected for joint axial movement by ball bearing means 40 but independently rotatable relative to each other. The rings of teeth 22 and 24 are on portion 34 and the rings of teeth 26 and 28 on portion 36 of the slideable sleeve 20.

The planetary gear unit, designated generally by the numeral 18, surrounds the mating ends of the input shaft 2 and the output shaft 4. A toothed annulus 42 is permanently located against rotation within the housing by attachment means. As shown, the attachment means is a screw 44 penetrating the annulus 42 and extending into a bearing block 45. The bearing block 45 is fixed to a wall 47 by means of a screw 49. A planet carrier assembly 46 includes a pair of axially spaced flange members or rings 48, 50 joined by a plurality of circumferentially spaced bolts 52 that form planet pinion shafts (only one shown). Journalled for rotation on the shafts 52 are planet pinions 56. Washers 54 on the shafts 52 between the pinions 56 and ring members 48, 50, act to axially align the pinions while discs or bearings 51 in contact with the plates 53 and block 45 act to axially locate and align the complete carrier assembly.

Figure 2:
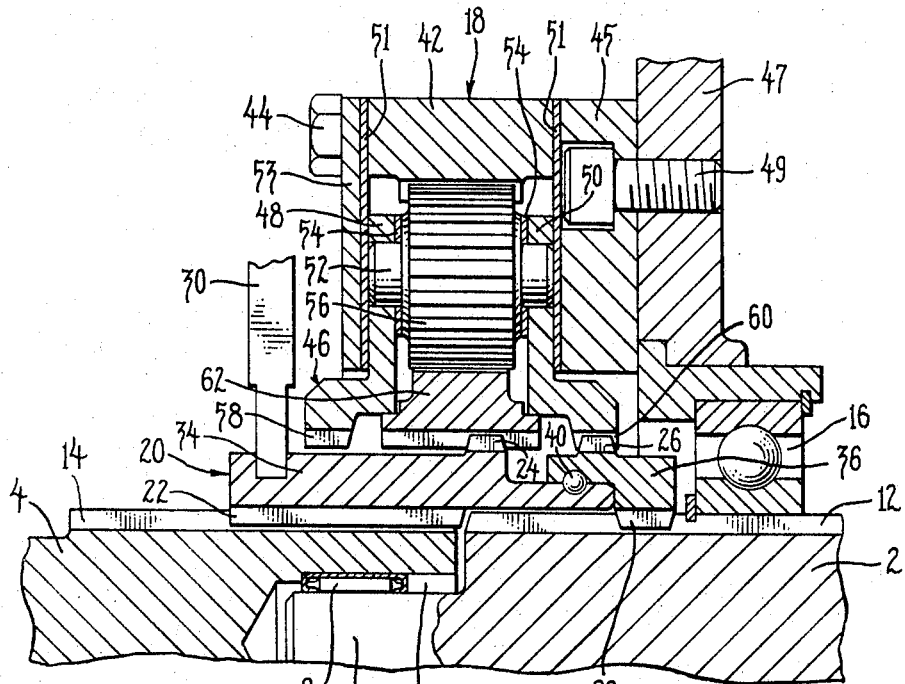
FIG. 2 is a similar view as the section in FIG. 1 illustrating the overdrive position and FIG. 3 the underdrive position.
Figure 3:
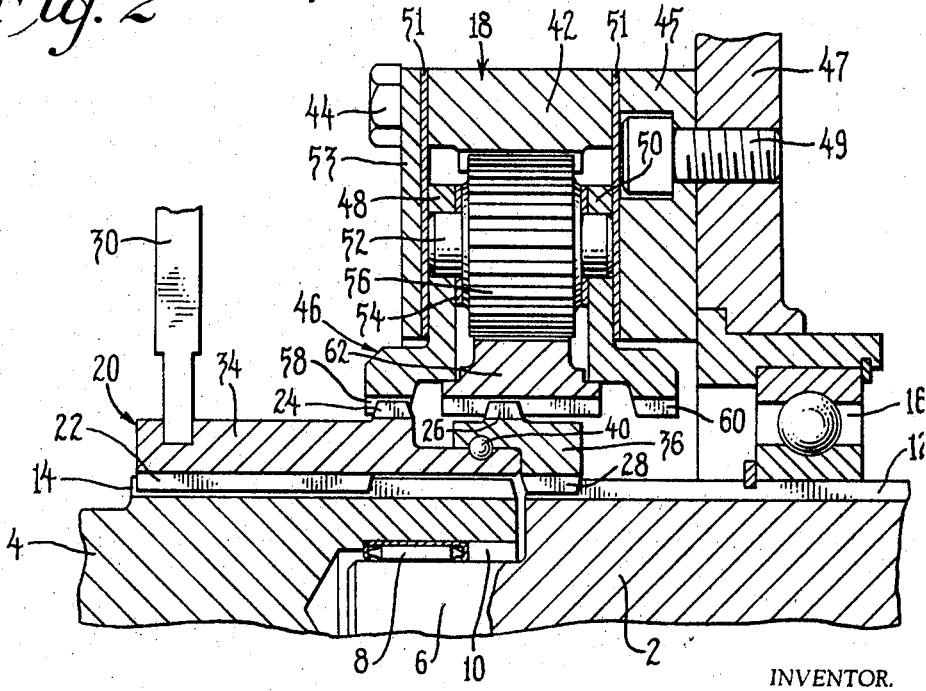

Between the planet wheels 56 and the slideable sleeve 20 a sungear 62 is rotatably arranged. With its outer toothed annulus it engages the planet wheels, and with its inner toothed annulus it is adapted to engage the toothed ring 24 and/or the toothed ring 26 of the clutch device 20. FIGS. 2 and 3 show that, depending on the lateral positioning of the clutch device 20 its teeth 24 can also be placed in engagement with the teeth 58 of the space ring 48, and the teeth 26 can also be placed in engagement with the teeth 60 of the space ring 50.

A description of the operation will show how the three gear ratios are established with the improved change speed planetary transmission. The position illustrated in FIG. 1 is the 1:1 drive arrangement where there is operative engagement between both portions of the slideable clutch 20 and the sungear 62. The drive shaft 2 rotates the portion 36 of the slideable sleeve 20 due to the interengagement between the teeth 12 of the input shaft 2 with the teeth 28 of the sleeve portion 36 of the clutch 20. Since the other portion 34 of the clutch 20 is by way of teeth 24 also in rotatable engagement with the sungear 62, the two clutch portions 34 and 36 which are interconnected by the sunwheel 62 rotate with equal speed and thus both the input shaft 2 and the output shaft 4 rotate uniformly.

FIG. 2 shows the overdrive position characterized by the operable interengagement between input shaft 2, sleeve portion 36 of the clutch 20 and the teeth 60 of the carrier ring 50. Since the ring gear 42 is prevented from rotation, rotation of the carrier 46 will cause the planet pinions 56 to walk around inside of the ring gear 42 and thus cause rotation of the sungear 62 in a forward direction at an increased or overdrive speed depending on the ratio of the number of teeth on the sungear 62 and the ring gear 42.

FIG. 3 illustrates the position in which the driven shaft rotaets more slowly than the drive shaft. This transmission of rotary motion is achieved by shifting the clutch device 20 to the position shown so that there is one interengagement between the drive shaft 2, the sleeve portion 36 and the sungear 62; and another interengagement between the space ring 48, the sleeve portion 34 and the driven shaft 4. This is the reverse arrangement from the one shown in FIG. 2 so that due to the characteristics of the planetary gear unit the driven shaft is in underdrive relationship to the drive shaft. With the sungear 62 driven in a forward direction and the ring gear 42 held from rotation, the planet pinions 56 walk around inside of the ring gear 42 and cause the carrier 46 to rotate forward at a reduced ratio.

It is thus clearly seen that by movement of a single control member 30, the transmission, which is a simple planetary gear set, can be conditioned to provide three distinct gear ratios. It is obvious that the principle of the unitary controlled two-piece clutch unit to engage the input and output shafts to different gear elements could be used in other arrangements. For example, the clutch could act to alternatively connect the sungear and ring gears of the planetary unit while the carrier is held against rotation. In this instance there would be two different underdrive ratios as the one to one ratio. One underdrive ratio would be less than 2 to 1 and the other greater than 2 to 1.

Other arrangements, modifications and applications of the invention will be apparent to those skilled in the art and are deemed to be within the scope of the invention which is limited only by the following claims.

I claim:
1. A three-speed transmission including an input shaft, an output shaft, a planetary gear unit including a sungear element, a ring gear element, and a plurality of planet pinion gears journalled on a planet carrier element and meshing with said sungear and said ring gear, a clutch device operable to alternatively: in a first condition, to connect the input shaft to a first one of the elements and simultaneously connect the output shaft to a second one of the elements; in a second condition, to connect the input shaft to said second one of the elements and simultaneously connect the output shaft to said first one element; and in a third condition, to connect both said input shaft and said output shaft to one of said first or second elements, and means for preventing rotation of the third of said elements, said clutch device comprising a two portion slidable assembly, one portion of said assembly having drive means in constant driving relationship with said input shaft and the other having drive means in constant driving relationship with said output shaft, tooth means on said one portion alternatively engageable with tooth means on said first element or tooth means on said second element, tooth means on said other portion alternatively engageable with tooth means on said first element or tooth means on said second element, means connecting said portions for common axial movement while permitting relative rotational movement, and a single shifter means for simultaneously moving both of said portions to provide said three conditions of operation.

2. The transmission of claim 1 wherein said first one element is said sungear and said second one element is said planet carrier.

3. The transmission of claim 2 wherein said sungear element is centrally apertured and has its tooth means internally arranged, the carrier member tooth means are aligned therewith, the input and output shafts are coaxially arranged concentrically within the sungear element, the clutch device is concentrically arranged about the input and output shafts, and the input and output shaft tooth means are peripherally arranged to engage the sungear element tooth means.

References Cited
UNITED STATES PATENTS

| | | | |
|---|---|---|---|
| 753,785 | 3/1904 | Archer | 74—750 |
| 2,137,778 | 11/1938 | McCullough | 74—750 X |
| 2,592,910 | 4/1952 | Keller | 74—750 X |
| 2,601,151 | 6/1952 | Keller | 74—750 X |
| 2,787,919 | 4/1957 | Senkowski et al. | 74—750 |
| 2,854,108 | 9/1958 | Douglas | 74—750 X |

FOREIGN PATENTS

| | | |
|---|---|---|
| 844,901 | 8/1960 | Great Britain. |

DONLEY J. STOCKING, Primary Examiner

THOMAS C. PERRY, Assistant Examiner